(No Model.)

T. M. KENNEY.
BALL BEARING.

No. 437,997. Patented Oct. 7, 1890.

Witnesses:
Walter E. Lombard.
Colbert A. McClure.

Inventor:
Thomas M. Kenney,
by N. C. Lombard
Attorney.

UNITED STATES PATENT OFFICE.

THOMAS M. KENNEY, OF CAMBRIDGE, MASSACHUSETTS, ASSIGNOR OF ONE-HALF TO CHARLES BULLOCK, OF SAME PLACE.

BALL-BEARING.

SPECIFICATION forming part of Letters Patent No. 437,997, dated October 7, 1890.

Application filed June 12, 1890. Serial No. 355,135. (No model.)

*To all whom it may concern:*

Be it known that I, THOMAS M. KENNEY, of Cambridge, in the county of Middlesex and State of Massachusetts, have invented certain new and useful Improvements in Ball-Bearings, of which the following, taken in connection with the accompanying drawings, is a specification.

This invention relates to ball-bearings more especially intended for use in vehicle-wheels, but susceptible of being adapted to use for various other purposes; and it consists in certain novel features of construction, arrangement, and combination of parts, which will be readily understood by reference to the description of the drawings and to the claims hereinafter given, and in which my invention is clearly pointed out.

Figure 2:
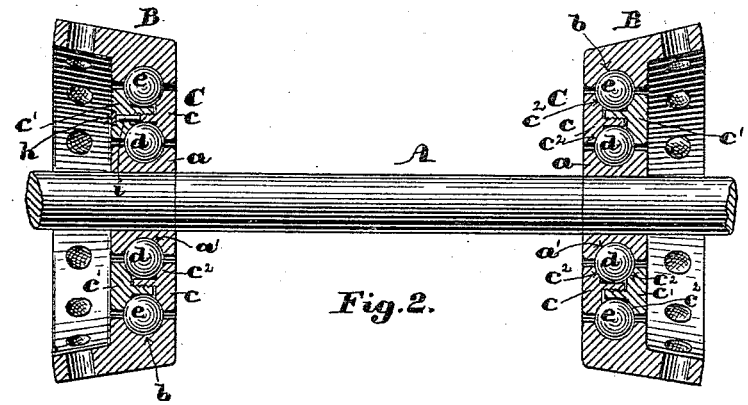
Figure 1:
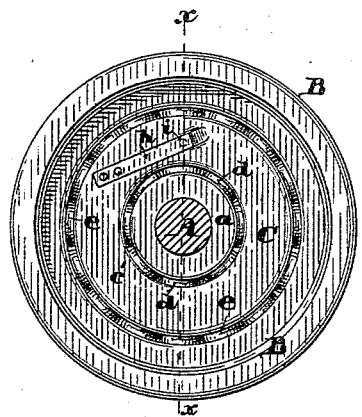
Figure 3:
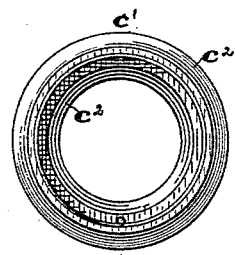

Figure 1 of the drawings is an end elevation of the hub of a bicycle-wheel, illustrating my invention with the axle in section. Fig. 2 is a longitudinal section of the hub, on line $x\ x$ in Fig. 1. Figs. 3, 4, 5, and 6 are details of the loose intermediate ring which separates the two series of balls.

In the drawings, A represents a portion of an axle of a bicycle, upon which are firmly secured at the proper distance apart the two collars or hubs $a\ a$, each having formed in its periphery an annular groove $a'$, which is nearly semicircular in cross-section.

B B are two frusto-conical rings, each provided with a series of holes to receive the inner ends of the spokes of the wheel and having formed in its inner periphery the annular groove $b$, also nearly semicircular in cross-section.

C is an intermediate loose ring, made in two parts $c$ and $c'$, provided, respectively, with male and female screw-threads, by means of which they may be adjusted toward or from each other, and each provided upon both its outer and inner peripheries with an annular bearing-surface $c^2\ c^2$ for the balls $d$ and $e$, as shown.

Between the hub $a$ and the ring C are placed a series of steel balls $d$, and between the rings B and C another series of similar balls $e$ are placed, as shown in Figs. 1 and 2.

Figure 5:
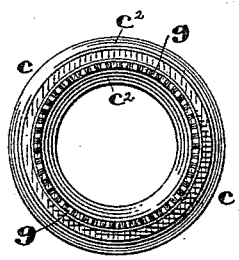
Figure 4:
Figure 6:

The ring $c$ has formed in its inner edge a series of ratchet-teeth $g$, as shown in Figs. 5 and 6, and the ring $c'$ has secured to its outer surface a spring $h$, carrying at its free end the locking-pin $i$, which projects through said ring upon its inner side in position to engage the teeth $g$ on the ring $c$ to lock said rings in their adjusted position and prevent their becoming unscrewed.

By lifting the free end of the spring $h$ the pin $i$ will be withdrawn from engagement with the teeth $g$, when one ring may be turned about its axis to adjust it toward or from its mate in order to adapt the bearing-surfaces for the balls $d$ and $e$ to the size of the balls, and when properly adjusted the locking-pin $i$ is again engaged with the teeth $g$ to lock the two rings, as before stated.

This invention is illustrated as applied to a bicycle-wheel, but it may be applied with advantage to bearings of revolving shafting of all kinds or to all kinds of wheels that revolve upon their axles.

A great advantage is obtained by the use of this bearing in the reduction of the friction and in the ability to adjust the bearing to take up the wear on both series of balls at the same time.

What I claim as new, and desire to secure by Letters Patent of the United States, is—

1. In a ball-bearing, the combination of the circumferentially-grooved hub $a$, the outer ring B, having an internal annular groove, two series of balls arranged in circles of different diameters, a loose ring interposed between said two series of balls and made in two parts screwed together and adjustable toward and from each other.

2. In a ball-bearing, the combination, with the fixed and revoluble portions of the housing, of two series of balls arranged in circles of different diameters, a loose ring made in two parts screwed together and adjustable toward and from each other and provided with annular ball-bearing surfaces upon its exterior and inner surfaces, a series of ratchet-teeth formed in the inner edge of one of the parts of said loose ring, and a spring-actuated locking-pin mounted upon the other part of said loose ring in position to engage with said ratchet-teeth and lock the two parts of said ring together.

In testimony whereof I have signed my name to this specification, in the presence of two subscribing witnesses, on this 9th day of June, A. D. 1890.

THOMAS M. KENNEY.

Witnesses:
  N. C. LOMBARD,
  MARY E. KENNEY.